INVENTOR.
BRUCE F. McLOUTH
BY
Williamson, Palmatier
& Bains
ATTORNEYS

United States Patent Office 3,448,702
Patented June 10, 1969

3,448,702
RECLAIMING APPARATUS AND METHOD
Bruce F. McLouth, 14909 Highland Lane,
Hopkins, Minn. 55343
Filed Jan. 2, 1968, Ser. No. 694,922
Int. Cl. F23g 7/00; C22b 11/00, 5/00
U.S. Cl. 110—18                                9 Claims

ABSTRACT OF THE DISCLOSURE

Scrap material containing precious metal, in particular printed circuit boards having strips of metal contained in epoxy-fiber glass laminates, is reduced and the metal reclaimed in an incinerator having a forced combustion burner from which a high velocity stream of pressurized combustion air impinges directly on the scrap material, and scatters the metallic residue and glass fibers to an area away from the burner flame where their temperatures will not exceed their melting points. The volatile plastics in the scrap material are vaporized and then completely burned in a secondary combustion chamber having two burner nozzles at different levels projecting radially inwardly towards the rising stream of combustion gases.

The feeder chute for the incinerator has an inner fire door, and an outer, swingably mounted access door which blocks the feeder chute when the fire door is open, but which may be conveniently swung to an open position when introducing scrap material into the incinerator.

---

This invention relates to incinerators, and especially to incinerators particularly designed to reclaim precious metals from scrap material with which they are combined. The reclaiming of valuable metals by reduction in a furnace presents problems which are not encountered in the ordinary incinerator operation. Foremost among these is the controlling of the temperature in the furnace combustion chamber in such a manner that the undesired waste materials are disposed of by burning without melting or otherwise damaging the precious metals. This problem is especially troublesome with respect to the present invention which is concerned with the recovery of metallic elements from printed circuit boards having epoxy-fiber glass laminations within which metallic strips are embedded. The complete combustion of the plastic components in the circuit boards requires a temperature on the order of 2000° F.; however, such a high temperature would cause certain metals such as gold and silver to melt or possibly vaporize. Such a high temperature would also cause glass fibers in the circuit board to deform and melt into a lump or conglomerant in which the metallic particles might become entrained so as to make their ultimate recovery extremely difficult.

Having in mind the foregoing difficulties associated with the recovery of metals from plastic-containing scrap material such as printed circuit boards, I have developed an incinerating process and apparatus which advantageously provides the complete combustion of undesired, plastic components while maintaining the metallic elements at such a position and temperature within the combustion chamber that they are not deformed or damaged in any way.

This basic objective is achieved by disposing a forced draft burner in the immediate vicinity of the pile of scrap material and inclining it downwardly towards the scrap pile so that the stream of high velocity combustion air discharged through the burner nozzle by the blower attached thereto will scatter the metallic residue out of the intense heat zone directly under the burner flame to a peripheral area within the combustion chamber in which its melting temperature will not be exceeded.

A particularly advantageous feature of my invention resides in the utilization of the aforesaid high velocity stream of combustion air to blow the glass fiber components of the scrap material away from the hottest part of the combustion chamber to the same area in which the metal components are accumulated, wherein the deformation or melting temperature of the glass fibers will not be exceeded. The glass fibers and metal particles are recovered together from the combustion chamber and subsequently separated.

The burner flame impinging directly on the scrap material serves to quickly volatize the plastic components, which are relatively heavily laden with unburned hydrocarbons as they rise upwardly in the furnace. The complete combustion of the rising plastic vapors is accomplished by after-burners located in a secondary combustion chamber, the after-burners being disposed one above the other and projecting radially inwardly towards the rising stream of combustion gases. This disposition of the secondary burners, one of which is angled downwardly towards the rising stream of combustion gases, causes the direct contact of the after-burner flames with the hydrocarbon vapors, thereby insuring the complete combustion thereof.

As a further advantageous feature of my invention, I provide a feeder chute for scrap material having an inwardly disposed and slidably mounted fire door, and a swingable access door located outwardly therefrom. When the fire door is opened, the swingable access door will block the feeder passage so as to prevent flashback therethrough, and scrap material can be easily introduced into the combustion chamber by simply swinging the access door to an open position.

These and other objects and advantages of my invention will become readily apparent as the following description is read in conjunction with the accompanying drawings, of which:

FIGURE 3 is a side, elevation view showing my improved feeder chute and access door arrangement;

The incinerating process and apparatus of this invention has been developed with a view towards recovering metallic particles from scrap materials containing combustible as well as non-combustible components. Among the metal-containing materials of this type, the printed circuit boards in widespread use today represent a particularly valuable source of precious metals because of the gold, silver, copper, platinum and possibly other metallic elements, which they contain in circuit form. It therefore becomes highly desirable to find some way of reclaiming the precious metals from printed circuit boards when they are disposed of. The reclaiming problem is complicated by the fact that printed circuit boards are constructed of laminated plastics comprising relatively non-combustible glass fibers and combustible plastics such as epoxy resins. The combustible plastics include light hydrocarbons which volatize at relatively low temperatures and which have relatively low flash points as well as heavier hydrocarbons which have relatively high flash point temperatures. The complete combustion of the plastic materials, especially those containing the heavier hydrocarbons, in order to avoid the emission of excessive smoke and air-polluting gases from the incinerator in which the circuit boards are being reduced requires the use of quite high combustion temperatures. Such temperatures would in many cases cause the melting or deformation of the metallic components as well as the reinforcing glass fibers. Not only is the melting of the precious metals not desired, but also the melting of the glass fibers with which the metal particles or strips are commingled would result in the formation of lumps or conglomerates of fiber glass in which the metal particles would become entrained and extremely difficult to recover.

Figure 1:
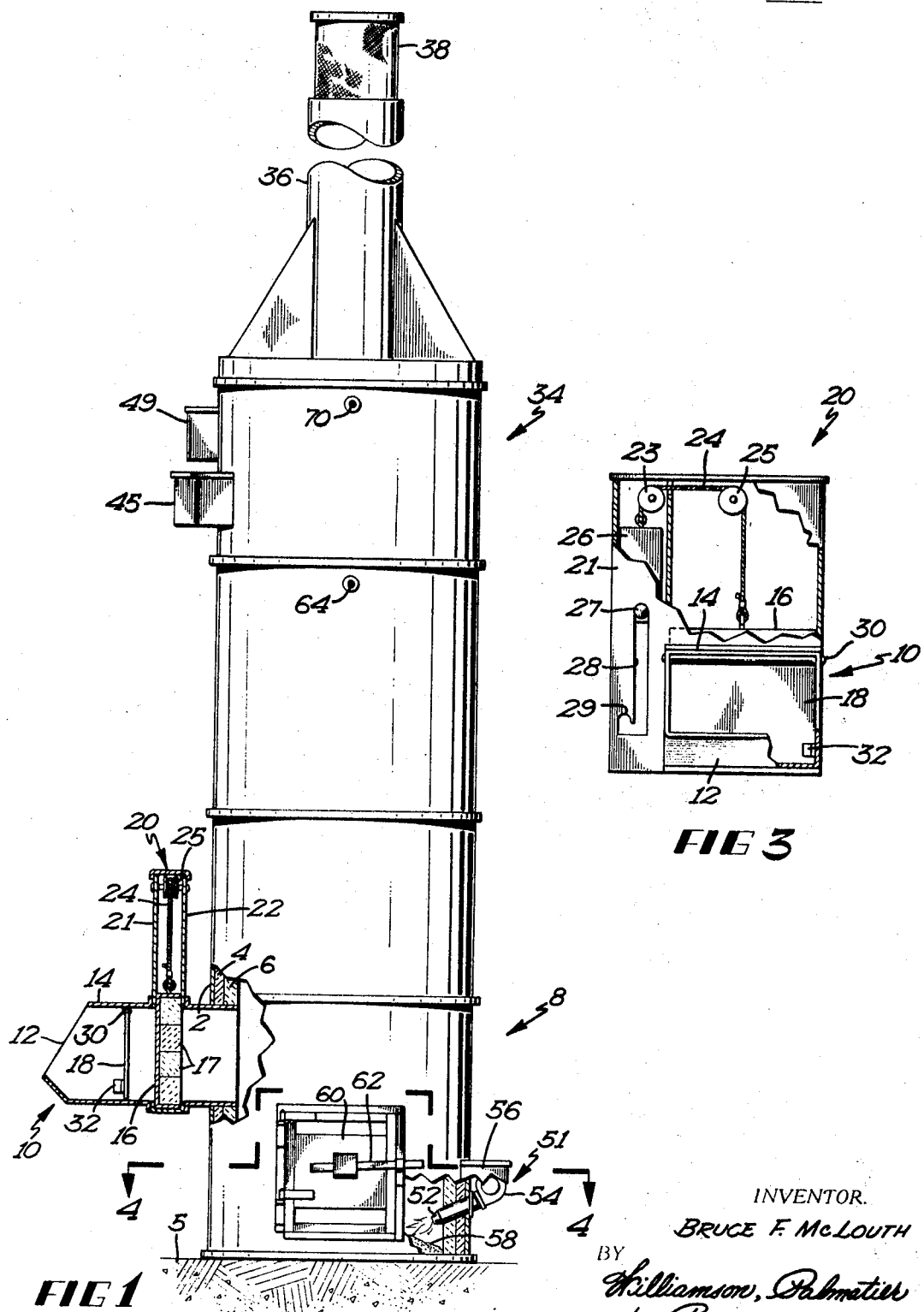
FIGURE 1 is a front elevation view of the incinerator of this invention.
Figure 2:
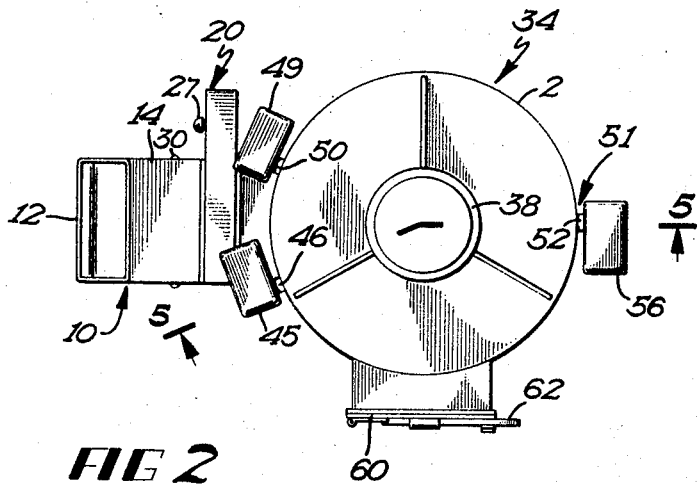
FIGURE 2 is a top view of the incinerator of FIGURE 1.
Figure 4:
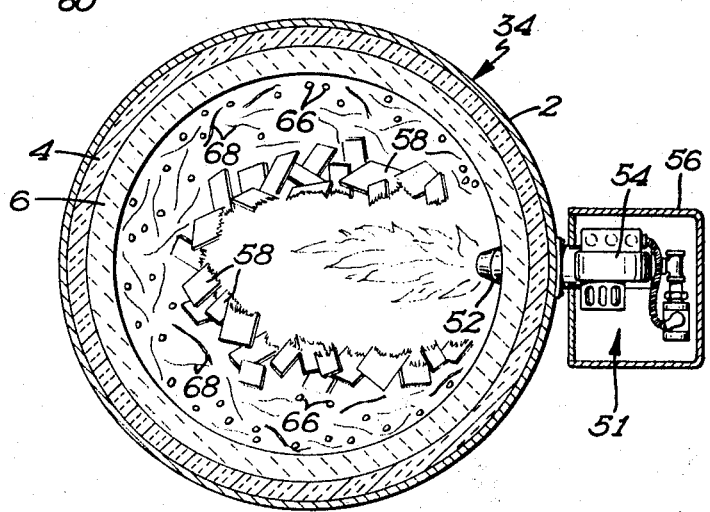
FIGURE 4 is a horizontal section view taken along lines 4—4 of FIGURE 1, and showing the lower portion of the combustion chamber.

The incinerator and burning process which I have developed to recover precious metals from printed circuit boards overcomes these problems by the utilization of two stages of combustion, with the primary combustion stage incorporating a forced air burner disposed in a particularly advantageous way with respect to the scrap material, as will be more fully explained below. As is indicated in FIGURES 1, 2 and 4, my improved incinerator is in the form of an elongated, upright enclosure of generally cylindrical cross section. The incinerator casing is comprised of an outer steel shell 2 insulated with a layer of material 4 of low thermal conductivity and having an inner lining 6 of refractory material such as fire brick. The incinerator will normally be mounted on a concrete base 5. The lower portion of the incinerator generally indicated by reference numeral 8 constitutes a primary combustion chamber into which scrap material to be reduced is introduced through elongated feed chute 10. Chute 10 has an outer mouth portion 12 and a generally horizontally extending throat or feed passage 14 which communicates at its inner end with an aperture in the side of the incinerator casing. As a particularly beneficial aspect of my improved incinerator. I utilize dual doors 16 and 18 which block feed passage 14 in their normally closed positions and prevent the passage of heat or flames therethrough. Inner door 16 is a fire door lined with heat resistant fire bricks 17. A guide frame generally indicated by reference numeral 20, and having front and back walls 21 and 22 slidably supports fire door 16 for vertical movement in and out of its blocking position within passage 14, as is best indicated in FIGURES 1 and 3. A pulley arrangement comprised of sheaves 23 and 25 and cable 24 from which counterweight 26 is suspended may be utilized for lifting fire door 16. By pulling downwardly on handle 27 of counterweight 26, and moving handle 27 into locking recess 29 of guide slots 28, fire door 16 may be raised to its open position and held there. Outer access door 18 is swingably mounted on horizontally extending pivot pin or hinge 30. Right angle stops 32 monuted on either side of feeder throat 14 abut the outer surface of access door 18 when it is in the vertically disposed closing position shown in FIGURE 1, thereby serving to prevent door 18 from swinging outwardly and permitting the discharge of heat and flames after scrap material has been forced inwardly through door 18.

When it is desired to add scrap material to combustion chamber 8, inner fire door 16 is raised to its open position by means of the above-described pulley and cable arrangement. The scrap material is then fed inwardly through throat 14 by pushing swingable door 18 inwardly. Feeder throat 14 is thus closed substantially all of the time, even when door 16 is raised, by means of access door 18. Door 18 is pushed open only momentarily in order to permit the forcing of scrap material inwardly through throat 14, and after the feeding means such as a hoe or shovel is withdrawn, door 18 will swing back to its closed, vertical position against stops 32. The disposition of access door 18 outwardly from heat and fire resistant inner door 16 permits door 18 to be constructed of relatively lightweight, non-heat resistant material. Also, the insulating effect of fire door 16 serves to maintain access door 18 at a temperature sufficiently low that it does not present a hazard to operators feeding scrap material through chute 10.

Figure 5:
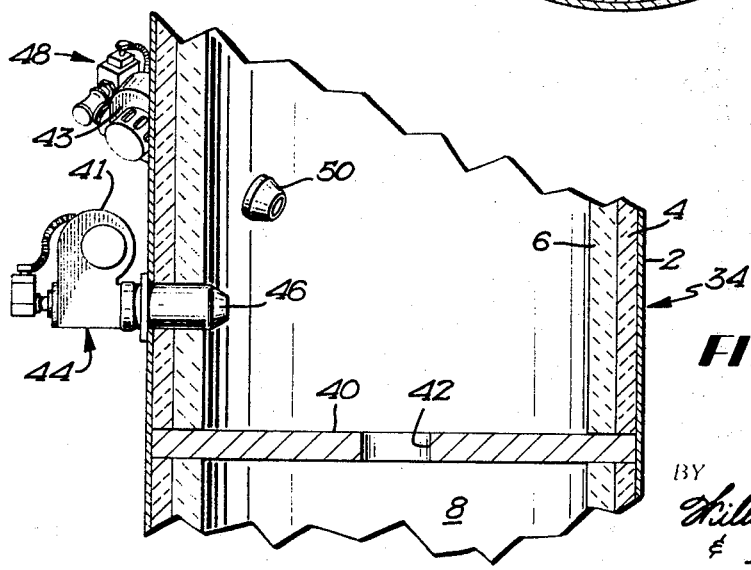
FIGURE 5 is a vertical section view of the secondary combustion chamber taken along lines 5—5 of FIGURE 2.

The upper portion of the incinerator is comprised of a secondary combustion chamber 34 which discharges into a smokestack 36 having a spark screen 38 at its upper end. Referring now to FIGURE 5, refractory baffle 40 separates upper combustion chamber 34 from lower chamber 8, with aperture 42 centrally located within baffle 40 permitting the upward flow of combustion gases from chamber 8 into chamber 34. In order to insure the complete combustion of hydrocarbon vapors rising upwardly through port 42, I provide two afterburners 44 and 48. These burners are of the forced combustion type, and are provided with blowers 41 and 43 which direct a stream of pressurized combustion air inwardly through burner nozzles 46 and 50. As is indicated in FIGURE 2, burners 44 and 48 are contained within weatherproof housings 45 and 49, and are circumferentially spaced about the outer periphery of upper combustion chamber wall 34. I have found that by positioning burners 44 and 48 apart by an angle less than 90°, and preferably by an angle on the order of 45°, the high velocity flames discharging from nozzles 46 and 50 will not interfere with each other so as to significantly disrupt the burning action, and will have the most beneficial effect on the rising stream of gases from primary combustion chamber 8. The burning action in secondary combustion chamber 34 is further enhanced by directing burner nozzles 46 and 50 radially inwardly towards the center of combustion chamber 34 so that their flames will directly contact the gases discharging from centrally located port 42. The most efficient and complete burning action was achieved by locating burner nozzle 50 above nozzle 46 and inclining it downwardly at an angle of approximately 20° to the horizontal. It is believed that the downwardly flowing stream of combustion air discharging from nozzle 50 combined with the generally horizontaly flowing flame and air stream from nozzle 46 causes turbulence in the gases coming out of port 42, which results in particularly good mixing of the gases and combustion air and extremely good burning action.

As will be seen with reference to FIGURES 1 and 4, a burner assembly 51 including nozzle 52 and blower 54 is mounted on the lower end of primary combustion chamber 8. These burner components are housed within a weatherproof casing 56. Burner 51, like burners 44 and 48 is preferably a gas burner; however, oil burners could also be utilized. Burner assembly 51 is positioned in the immediate vicinity of the floor of primary combustion chamber 8 with burner nozzle 52 angled inwardly towards scrap material 58 deposited thereon. Burner nozzle 52 is disposed directly above the pile of scrap material 58, and is positioned so that the flames and combustion air discharging therefrom will impinge against the approximate center of the scrap material. Combustion chamber 8 is also provided with a clean-out door 60 having a swingable latch arm 62 by means of which door 60 may be opened and closed.

Although various types of scrap material could be disposed of in my improved incinerator, burners 51, 44, and 48 have been particularly arranged so as to effectively accomplish the reduction of printed circuit boards and the recovery of the precious metals contained therein. The scrap circuit boards indicated by reference numeral 58 in FIGURES 1 and 4 are comprised of plastic laminations having strands of fiber glass as strengthening material and utilizing various plastics, particularly epoxy resins as binding agents. Valuable metals such as gold, silver, copper and platinum are contained within the plastic boards in the desired patterns to form electric circuits. The metal conductor strips and glass fibers are non-combustible; however, these materials will deform and melt if subjected to sufficiently high temperatures. Fiber glass will lose its shape or deform at approximately 1100° F. and will melt at about 2600° F. The melting temperatures of some of the metals which could be used as conductors are: gold—1945° F.; silver—1760° F.; and platinum—3223° F. The plastic binding agents, such as epoxy resins, are combustibles volatile at relatively low temperatures. However, these combustible plastics include both light and heavy hydrocarbons, the latter having relatively high flash points requiring temperatures as high as 2000° F. for their complete combustion. Thus, if an attempt were made to carry out the complete reduction of printed circuit boards in a single combustion chamber, the high temperatures required to vaporize and completely burn the plastic binding agents would very likely cause the melting of the precious metals and the deforming and melting of the glass fiber strands into lumps or globs. If the fiber glass deforms and becomes fluid to any degree, it is quite possible that the strips and particles of metal would become caught in the lumps of glass fibers and become extremely difficult to recover. Also, even though the temperature in combustion chamber 8 is maintained below the melting point and deformation temperature of the metals and glass fibers, these materials may still melt and deform if directly exposed for more than a short period of time to the burner flame.

I have overcome these difficulties by providing first and second combustion chambers 8 and 34, and by utilizing burner 51 to particular advantage. In order to insure the preservation of the precious metals and the glass fibers in their solid state, the temperature in combustion chamber 8 in the vicinity of the pile of scrap material 58 is maintained below a maximum level of 600° F. To accomplish this, burner 51 is thermostatically controlled by a thermocouple 64 inserted through the wall of combustion chamber 8. Also, combustion chamber 8 is sized to be relatively large for its contemplated burning capacity, thereby providing excess volume in which low temperatures may more easily be maintained. With a temperature of approximately 600° F. near the pile 58 of scrap material, the temperature at the outlet of combustion chamber 8 near exhaust port 42 will be about 450° F. At a temperature of 600° F., the plastic binding agents in the printed circuit boards will vaporize; however, the metal and fiber glass components will not undergo any change of state.

Some means must also be provided to continuously move the metal particles and fiber glass strands out of the immediate vicinity of the burner flame, which may burn at temperatures as high as 1500° F. to 1800° F. I have been able to accomplish this objective by effectively utilizing the high velocity stream of combustion air which blower 54 discharges from burner nozzle 52. The relatively high volume of combustion air forced into the incinerator by blower 54 is needed to support the combustion of the burner flame as well as to provide combustion air for the complete burning of the scrap material 58. By disposing burner nozzle 52 in the aforesaid manner so that it discharges a high velocity stream of combustion air directly down into the center of the pile of scrap material 58, metal particles 66 and fiber glass strands 68 will be continuously blown away from the hot burner flame towards the cooler, outer periphery of combustion chamber 8. The high flame temperature, and the overall temperature of approximately 600° F. maintained within combustion chamber 8 will be sufficient to vaporize the combustible plastic binding elements in the printed circuit boards 58. Metal particles 66 and fiber glass strands 68 remain intact around the periphery of combustion chamber 8, and are commingled with each other. These materials are periodically recovered through clean-out door 60, and the metal particles are subsequently separated from the fiber glass.

The vaporized plastic components rise upwardly through combustion chamber 8 and pass through discharge port 42 into secondary combustion chamber 34. Upper combustion chamber 34 is maintained at a temperature of from 1800° F. to 2100° F. in order to insure the complete combustion of the heavier hydrocarbon components in the plastic binding agents. Proper control of the temperature in combustion chamber 34 is achieved by utilizing a second thermocouple 70 to cycle upper burner 48. The particular disposition of burner nozzles 46 and 50 noted above imparts considerable turbulence to the vapors rising through port 42, and significantly contributes to the thorough burning thereof.

Those skilled in the art will readily appreciate that the utilization of the high velocity stream of combustion air from burner nozzle 52 to sweep the precious metal components into a relatively cool zone greatly facilitates the recovery of precious metals in a reducing process. This feature, combined with the effective utilization of a plurality of burners and a secondary combustion chamber permits the reclaiming of the metal components in their solid state while at the same time insuring the total burning of the hydrocarbons of which the binding agents are comprised. The complete burning of the volatile components not only insures that excessive smoke will not be discharged from stack 36, but also prevents pollution of the surrounding atmosphere. The particular embodiments of my invention which I have shown and described are intended to be illustrative only. I contemplate that the incinerator apparatus and method which I have disclosed may be modified without departing from the spirit and scope of my invention as defined by the following claims.

What I claim is:

1. A reducing process for recovering precious metals from scrap material containing metallic elements in combination with combustible plastic components comprising the steps of:
  introducing said scrap material into a combustion chamber of a furnace;
  heating said scrap material by direct contact with a burner flame to a temperature exceeding the vaporization point of said plastic components;
  moving the residual metal out of the intense heat zone immediately adjacent said burner flame, and thereby maintaining said metal at a temperature below its melting point; and
  periodically recovering the residual metal from said furnace.

2. The reducing process defined in claim 1, wherein:
  said residual metal is moved out of said intense heat zone by a stream of pressurized combustion air directed upon said scrap material.

3. The reducing process defined in claim 2, wherein:
  said scrap material also contains relatively high-melting-point fiber glass, and further including;
  moving said fiber glass out of said intense heat zone by means of said combustion air stream; and
  maintaining the temperature in said combustion chamber below the temperature level at which said fiber glass will deform.

4. The reducing process defined in claim 1, and further including:
  directing the vaporized plastic components into a second combustion chamber and substantially completely burning them in the presence of a second burner flame.

5. An incinerator for reducing scrap material containing precious metal comprising:
  an elongated casing defining a combustion chamber and having a flue gas outlet;
  a feed passage extending through an aperture in said casing;
  a material-supporting member in said combustion chamber on which scrap material delivered through said feed passage may be accumulated and burned;
  a fuel burner extending through said casing immediately adjacent said material-supporting member, said burner including a nozzle angled downwardly towards said scrap material on said supporting member and blower means injecting a stream of pressurized combustion air through said nozzle directly into said scrap material, whereby the precious metal in said scrap material will be blown towards the outer periphery of said combustion chamber away from the intense heat zone directly under the flame extending from said burner.

6. The incinerator as defined in claim 5, wherein said feed passage comprises:
   an elongated chute having an open mouth portion at its outer end and extending at its inner end through an aperture in said casing;
   a fire door disposed across said chute and slidably movable to an open position wherein it does not block access through said chute, said fire door being constructed of heat resistant and insulating materials; and
   an outer access door disposed across said chute outwardly from said fire door and pivotally mounted for swinging movement.

7. The incinerator as defined in claim 6 and further including:
   stop means in said chute disposed in abutting relation with the outside surface of said access door when in its normally closed position, thereby preventing said access door from swinging outwardly and opening said passage after a feeding operation.

8. An incinerator comprising:
   an elongated casing defining a first combustion chamber;
   a second combustion chamber disposed above said first combustion chamber and having a flue gas outlet;
   a dividing wall separating said first and second combustion chambers and having an aperture therein through which combustible gases may flow upwardly from said first combustion chamber;
   two fuel burners extending into said second combustion chamber, one of said fuel burners having a nozzle projecting substantially horizontally along a line extending over said aperture, and the other one of said fuel burners having a nozzle disposed above said horizontally projecting nozzle and inclined downwardly at an angle to the horizontal.

9. The incinerator as defined in claim 8, wherein:
   said burner nozzles in said second combustion chamber are spaced apart less than ninety degrees about the periphery of said second combustion chamber.

References Cited

UNITED STATES PATENTS

| | | |
|---|---|---|
| 1,776,914 | 9/1930 | Langford. |
| 1,995,723 | 3/1935 | Van Denburg. |
| 2,625,121 | 1/1953 | Vanderwerf. |
| 2,880,682 | 4/1959 | Peterson et al. _____ 110—18 |
| 3,076,421 | 2/1963 | Spitz. |
| 3,320,051 | 5/1967 | Lieberman. |

JAMES W. WESTHAVER, *Primary Examiner.*

U.S. Cl. X.R.

75—65; 110—8